_3,054,803_
2-ALKENYL-5-LOWER ALKYL-5-HYDROXY-METHYL-META DIOXANES
Max O. Robeson and James H. George, Corpus Christi, Tex., assignors to Celanese Corporation of America, New York, N.Y., a corporation of Delaware
No Drawing. Filed June 23, 1959, Ser. No. 822,210
4 Claims. (Cl. 260—340.7)

This invention relates to acetals of trimethylolpropane and relates particularly to acetals of trimethylolpropane and an unsaturated aldehyde.

It is an object of this invention to provide new and useful chemical compounds.

Other objects of this invention will be apparent from the following detailed description and claims. In this description and claims all proportions are by weight, unless otherwise indicated.

In accordance with one aspect of this invention there is prepared an acetal having the formula:

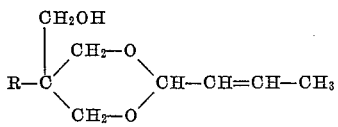

Where R is a monovalent hydrocarbon radical. We have obtained such acetals at high efficiency by the reaction of crotonaldehyde and a compound having three methylol groups on a single carbon atom in the presence of an acid catalyst. A particularly suitable catalyst is phosphoric acid. Strongly acid cation-exchange resins containing sulfonic acid groups are less efficient, causing some autocondensation of crotonaldehyde. Among other catalysts which may be employed are oxalic acid and trichloroacetic acid.

The following examples are given to illustrate this invention further.

Example I 268 parts of trimethylolpropane (2 moles), 420 parts of crotonaldehyde (6 moles) and 3 parts of 85% phosphoric acid (0.03 mole) were stirred vigorously and heated at the boiling point, for 3 hours, in a vessel equipped with a decanter head and reflux condenser. During this three hour period 36 parts (2 moles) of water were removed while condensed water-immiscible material was continuously returned to the reaction mixture. The reaction mixture was then cooled and washed with 110 parts of a water solution containing 10 parts of sodium bicarbonate to neutralize the catalyst. The washed material was again washed with 200 parts of water to effect further removal of salts.

The washed mixture was distilled at atmospheric pressure to remove unreacted crotonaldehyde as its water azeotrope overhead and the residue was then vacuum flashed at 2 mm. Hg A, with heating, until the base temperature reached 205° C. and the top temperature (vapor temperature) reached 170° C. The resulting flash distillate was then fractionated at 50 mm. Hg A using a 15 tray Oldershaw (sieve tray) column to produce a colorless oily fraction boiling at 182–184° C. (at 50 mm. Hg A). By analysis for unsaturation this fraction was 99% pure monocrotylidene trimethylolpropane; by analysis for hydroxyl content its purity was 99.6%. It had a specific gravity 25/20° C. of 1.0441; its viscosity at 25° C. was 160 cps.; it was insoluble in water, but soluble in pentane, acetone, ethanol, n-butanol, benzene and ethyl acetate.

Example II

Example I was repeated, except that trimethylolethane was used in place of the trimethylolpropane, to produce monocrotylidene trimethylolethane. This material boiled at about 150° C., at 20 mm. Hg A, and at about 257° C. at atmospheric pressure; its specific gravity 25/4° C. was 1.0488; its viscosity at 25° C. was 136 cps.; and when cooled, in an attempt to determine its freezing point, it formed a glassy solid at −43° C.

Each of the acetals of this invention has a reactive ethylenic double bond as well as a reactive primary alcoholic group. They may be used for forming resins useful in the coating, casting and molding arts; for example by heat-reaction at the double bond (in the presence of a catalyst such as p-toluene sulfonic acid) with a polyol (such as sorbitol, glycol or glycerol, e.g. 1/6 mole sorbitol per mol of acetal.)

The alcoholic acetals of this invention may be homopolymerized or copolymerized with vinyl monomers and the resulting polyhydroxy compounds may be reacted with polyisocyanates for the formation of polyurethanes. The alcoholic acetals of this invention may be reacted with polyglycols to produce polyethers having primary alcoholic groups, useful for the making of polyurethanes. The alcoholic acetals may be reacted with polybasic acids; for example, with two moles of dicarboxylic acid, one carboxyl group esterifying the primary alcohol in classical manner, and the other adding across the double bond to produce diesters for lubricant and plasticizer use. The alcoholic acetals may be used as modifying reactants in the making of novolacs, melamine-formaldehyde and urea-formaldehyde resins. The alcoholic acetals may also be used as monohydric alcohols to modify alkyd resins to produce ethylenically unsaturated alkyd resins. The alcoholic acetals may be reacted, at their double bonds, with alcohols and then oxidized with air to form hydroperoxides at their tertiary carbon atoms. The alcoholic groups of the acetals may be esterified, as with fatty acids, after which their double bonds may be epoxidized to form plasticizers or stabilizers. The alcoholic acetals may be reacted, at their double bonds, with dicarboxylic acids, and then epoxidized.

While the invention has been described particularly in connection with dicrotylidene trimethylolpropane and dicrotylidene trimethylolethane, the same type of reaction may be employed for the manufacture of other novel compounds having the formula

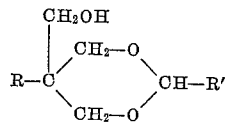

where R is a monovalent hydrocarbon substituent, e.g. lower alkyl group; and R' is a monovalent ethylenically unsaturated substituent, preferably free from other reactive groups, e.g. an alkenyl group. For example, in the reaction another unsaturated monoaldehyde, such as acrolein, methacrolein, 2-methyl pentenal or 2-ethyl hexenal, may be used instead of crotonaldehyde, to produce such compounds as monoallylidene trimethylolpropane, monomethallylidene trimethylolpropane, and monoallylidene (or monomethallylidene) trimethylolethane or mono-(2-methyl pentenylidene)trimethylolpropane or mono-(2-ethyl hexenylidene)trimethylolbutane.

It is to be understood that the foregoing detailed description is given merely by way of illustration and that many variations may be made therein without departing from the spirit of our invention.

Having described our invention what we desire to secure by Letters Patent is:

1. A compound of the formula

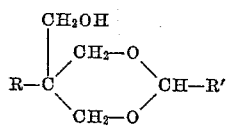

where R is lower alkyl and R' is lower alkenyl.
2. Monocrotylidene trimethylolpropane.
3. Monocrotylidene trimethylolethane.
4. A compound of the formula

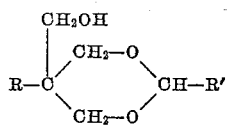

where R is lower alkyl and R' is alkenyl.

References Cited in the file of this patent

UNITED STATES PATENTS

| | | |
|---|---|---|
| 2,691,026 | Harvey | Oct. 5, 1954 |
| 2,729,650 | Habeshaw | Jan. 3, 1956 |
| 2,945,008 | Caldwell et al. | July 12, 1960 |

OTHER REFERENCES

Schulz et al.: Angewandte Chemie, vol. 62, page 113 (1950).

Blicke et al.: J.A.C.S., vol. 76, pp. 3153–3156 (1954).